United States Patent [19]

Lenke et al.

[11] Patent Number: 5,223,588
[45] Date of Patent: Jun. 29, 1993

[54] IN-SITU COMPOSITES

[75] Inventors: Gerd M. Lenke; Donald R. Wiff, both of Akron, Ohio

[73] Assignee: GenCorp Inc., Fairlawn, Ohio

[21] Appl. No.: 783,460

[22] Filed: Oct. 28, 1991

Related U.S. Application Data

[62] Division of Ser. No. 377,987, Jul. 11, 1989, Pat. No. 5,068,292.

[51] Int. Cl.$^5$ .............................................. C08L 61/20
[52] U.S. Cl. ..................................... 525/509; 525/424; 525/427; 525/432; 525/535
[58] Field of Search ............... 525/509, 423, 510, 399, 525/400, 411, 414, 424, 427, 432, 436, 440, 441, 465, 467, 535

[56] References Cited

U.S. PATENT DOCUMENTS

| | | | |
|---|---|---|---|
| 3,372,132 | 3/1968 | Cruz, Jr. | 527/312 |
| 4,207,407 | 6/1980 | Helminiak et al. | 525/425 |
| 4,228,218 | 10/1980 | Takayanagi et al. | 525/58 |
| 4,377,546 | 3/1983 | Helminiak et al. | 264/232 |
| 4,412,148 | 10/1983 | Klicker et al. | 310/358 |
| 4,414,362 | 11/1983 | Lenke et al. | 525/178 |
| 4,448,956 | 5/1984 | Lenke et al. | 528/312 |
| 4,614,784 | 9/1986 | Kozakiewicz | 527/313 |
| 4,631,318 | 12/1986 | Hwang et al. | 525/432 |
| 4,742,128 | 5/1988 | Frisch et al. | 525/422 |
| 4,977,223 | 12/1990 | Arnold et al. | 525/432 |
| 5,068,292 | 11/1991 | Lenke et al. | 525/509 |

FOREIGN PATENT DOCUMENTS 2008598 6/1979 United Kingdom .

OTHER PUBLICATIONS

"Polymer Composites of Rigid and Flexible Molecules: System of Wholly Aromatic and Aliphatic Polyamides," J. Macromol. Sci.-Phys., B17(4), 591 (1980).

"Composites on a Molecular Level: Phase Relationships, Processing, and Properties," J. Macromol. Sci.--Phys., B22(2), 231 (1983).

*Primary Examiner*—John C. Bleutge
*Assistant Examiner*—D. Aylward

[57] ABSTRACT

A composite material is comprised of an in situ polymerized rigid rod polymer and an in situ polymerized matrix polymer. The composite material is isotropic and has enhanced mechanical properties as well as improved temperature resistance, improved solvent resistance and improved moisture resistance.

16 Claims, 2 Drawing Sheets

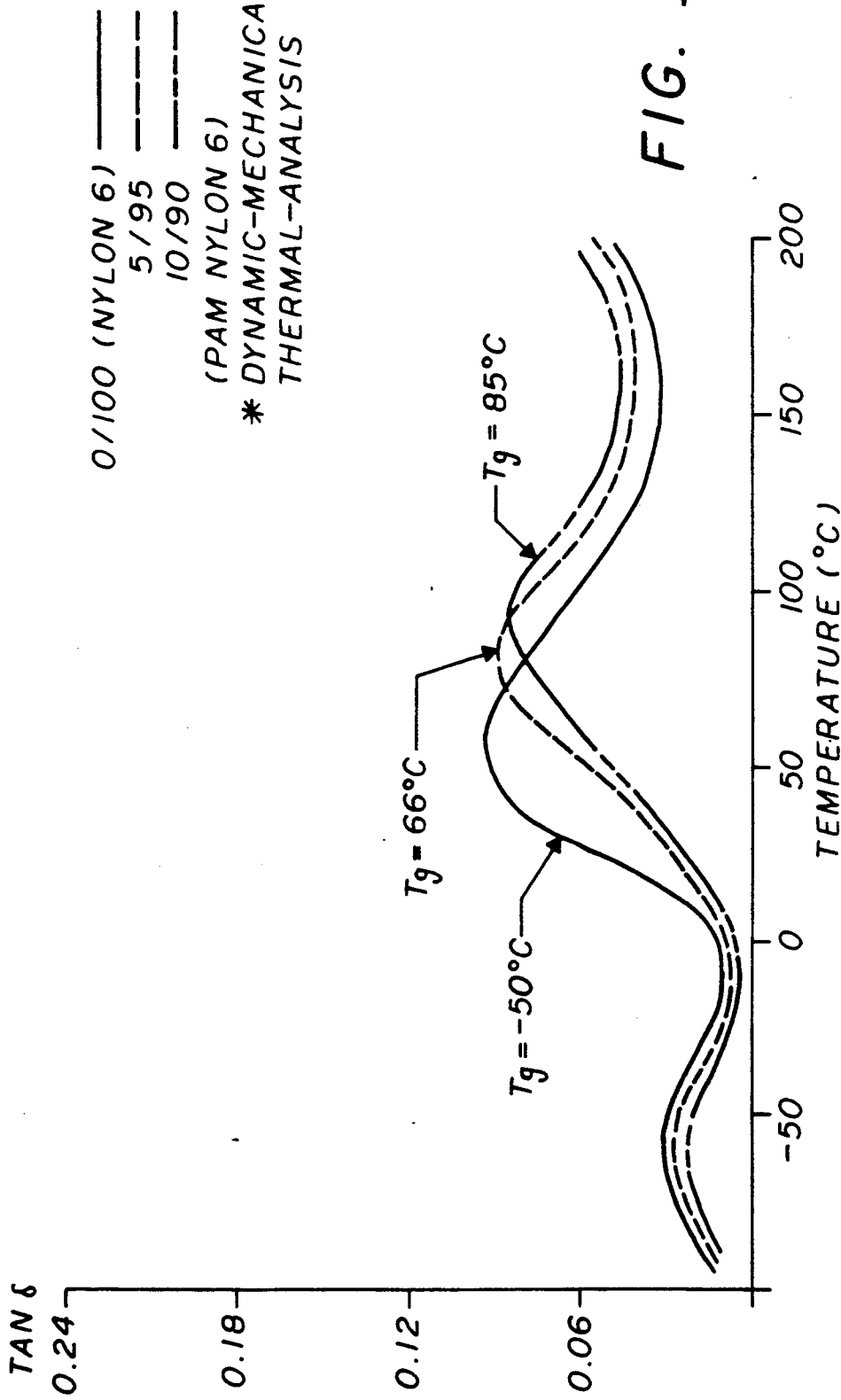

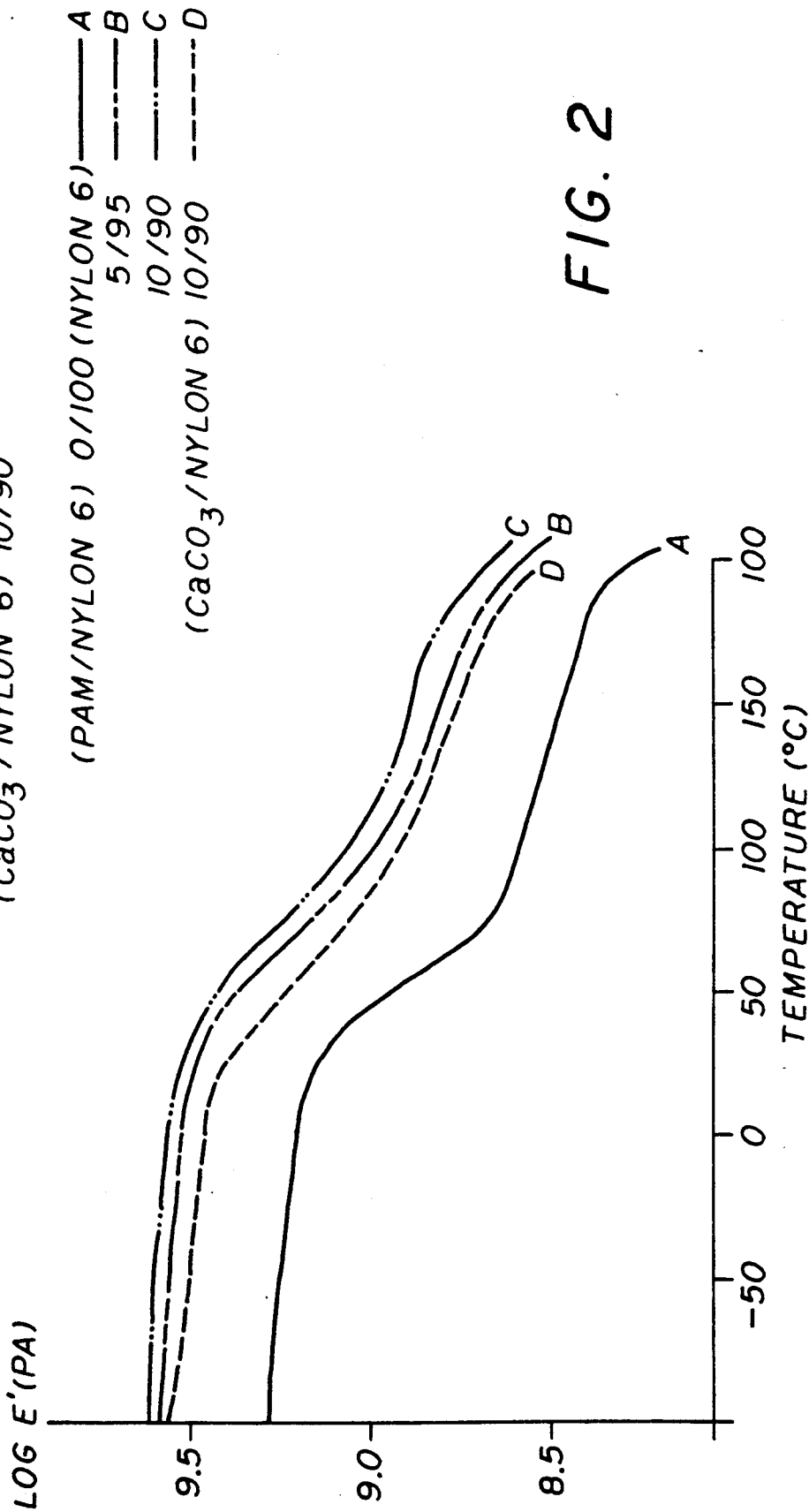

IN-SITU COMPOSITES

This is a division of application Ser. No. 07/377,987, filed Jun. 11, 1989, now U.S. Pat. No. 5,068,292.

FIELD OF THE INVENTION

The invention relates to a composite material comprising an in situ rigid rod polymer and an in situ matrix polymer. The composite material has enhanced mechanical and physical properties. The composite material may also contain other components, such as colors, oderants, and fungicides. These ingredients may be present in an effective amount which does not adversely affect the composite, the composite's improved properties or the method of making it.

BACKGROUND OF THE INVENTION AND PRIOR ART

Composite materials having enhanced mechanical and physical properties over conventional polymers are well known. For example, polyester reinforced with fiberglass has been used where enhanced physical properties are necessary in load bearing structures. However, such fiber reinforced plastics have certain drawbacks. Generally, a minimum of thirty percent by weight of reinforcing fiber is required for enhanced mechanical properties. Since the length of the fibers necessary to impart structural improvement is greater than one centimeter, the processability of fiber reinforced plastics is limited.

The limits of fiber reinforced plastics have led to efforts to produce a reinforced plastic by forming a composite with a reinforcing material present on the molecular level. Attempts were made to achieve the molecular composite by physically melt mixing thermoplastic nylon 66 and a finely pulverized reinforcement, poly-p-phenylene terephthalamide. M. Takayanagi, T. Ogata, M. Morikawa and T. Kai, *J. Macromol. Sci. Physics* 817, 591 (1980). The physical mixing process was limited by the inability to achieve dispersion on the molecular level. Others attempted to codissolve the reinforcing material poly-p-phenylene-benzobisthiazole with a plastic material. W. F. Hwang, D. R. Wiff, C. L. Benner, and T. E. Helminiak, *J. Macromol. Sci-Physics* 822(2), 231 (1983). U.S. Pat. No. 4,377,546 to Helminiak et al. discloses a composite material cast from methane sulfonic acid. Similarly, U.S. Pat. No. 4,631,318 discloses a composite material of poly-p-phenylene benzobisthiazole and nylon processed from a solution of methane sulfonic acid. The method of codissolving the rigid polymer and the matrix polymer is limited because the only suitable solvents are very strong acids.

U.S. Pat. No. 4,614,784 discloses a semi in situ composite material wherein a rigid rod-like liquid crystalline polymer is dissolved in a polymerizable solvent which is subsequently polymerized producing a polymeric liquid crystalline or isotropic alloy. However, one drawback to the semi in situ process is the limited solubility of suitable rigid rod polymers in polymerizable solvents. This drawback is overcome in the present invention by a complete in situ process, wherein precursors to the rigid rod polymer are dissolved in precursors to the matrix polymer and the polymerizations are carried out in sequence or simultaneously. Additionally, the in situ composite process of the present invention results in unexpected improvement in mechanical and physical properties of the in situ composite material with lower amount of the rigid rod polymer present in the composite material.

Accordingly, one object of the invention is to provide an in situ composite material with enhanced mechanical and physical properties.

Another object of the invention is to provide a method for making such an in situ composite material.

A further object of the invention is to provide a method of producing manufactured articles made out of the in situ composite material.

A still further object of the invention is to provide a process for producing manufactured articles made from the composite material adaptable to standard production techniques, such as the use of a polymer processing extruder.

SUMMARY OF THE INVENTION

According to the present invention, an in situ composite is comprised of an in situ polymerized rigid rod polymer and an in situ polymerized matrix polymer. The preferred in situ composite material comprises up to about 80 parts by weight of in situ rigid rod polymer for every 100 parts of composite material. The in situ composite has an in situ rigid rod polymer having an aspect ratio greater than 50 and preferably greater than 100. The aspect ratio is the length of the rigid rod polymer divided by its diameter. The most preferred in situ composite has about 10 parts by weight of in situ rigid rod polymer for every 100 parts of composite material wherein the in situ rigid rod polymer has an aspect ratio of at least about 50. In situ composite materials exhibit improved isotropic mechanical properties. In situ composite materials also exhibit improved temperature resistance, improved solvent resistance and improved moisture resistance.

A method for producing said in situ composite comprises the steps of dissolving precursors to a rigid rod polymer in precursors to a matrix polymer, reacting said precursors to the rigid rod polymer to form the rigid rod polymer in situ, and reacting said precursors to the matrix polymers to form the matrix polymer in situ. The steps may be carried out simultaneously or sequentially. The preferred method for producing in situ composites is that which produces preferred in situ composites.

Another aspect of the invention is the production of articles of manufacture, such as automobile panels and bumpers from the in situ composite materials. The production of articles of manufacture may be carried out in a standard polymer processing extruder, such as a twin screw extruder. The twin screw extruder process comprises dissolving the precursors of the in situ rigid rod polymer in the precursors of the in situ matrix polymer, reacting the precursors of the rigid rod polymer in the first screw device of the twin screw extruder, mixing the precursors to the matrix polymer with initiators and/or catalysts to form the matrix polymer in situ in the second screw device of the twin screw extruder and transferring the mixture into a mold to form an article of manufacture. Alternatively, polymerization of the matrix polymer in situ may be carried out in a casting mold having the form of the article of manufacture or by any other suitable method.

DETAILED DESCRIPTION OF THE INVENTION

There are numerous rigid rod polymers and matrix polymers which may be polymerized in situ to provide the in situ composite materials of the present invention. These materials are limited only to the extent that the precursors of the rigid rod polymer must be soluble (or capable of being adapted to be soluble) in the precursors of the matrix polymer.

One such class of rigid rod polymers suitable to the present invention are the polyazomethines. The precursors of one class of polyazomethine are arylene diamines, e.g., p-phenylenediamine and terephthaldialdehyde. Typically:

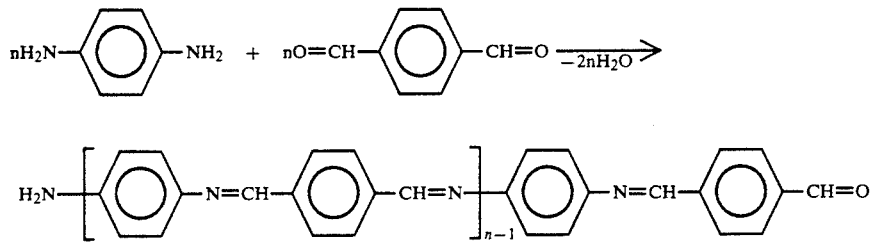

Depending upon charge ratios, the end groups may be all $NH_2$ or CHO or any conbination of $NH_2$ and CHO. The p-phenylene diamine and terephthaldialdehyde may be individually dissolved in separate amounts of a cyclic alkanoic acidamide, i.e., a lactam, e.g., ε-caprolactam. The two solutions are mixed together, whereupon the p-phenylene diamine and the terephthaldialdehyde undergo a condensation reaction to form the rigid rod polymer in situ. The caprolactam solvent may then be polymerized by a variety of methods to form the matrix polymer, nylon-6, in situ. Polymerization of the caprolactam may be accomplished by activated anionic techniques, such as those set forth in U.S. Pat. Nos. 4,414,362 and 4,448,956 to G. M. Lenke et al., which are incorporated herein as if fully rewritten. For example, an effective amount of the bis-caprolactam adduct of a polyisocyanato-aryl alkane, e.g., 4,4,'-diisocyanato-phenyl-methane, of the following formula may be added to the caprolactam as an initiator:

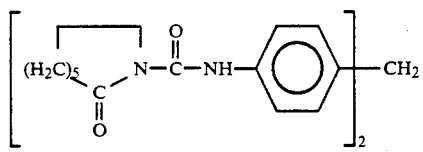

Alternatively, the initiator may be formed in situ, by adding a polyisocyanate to the molten lactam containing the rigid rod polymer. Other useful initiators are poly-lactamoyl imides of the following general formula as described in U.S. Pat. Nos. 3,862,262 and 3,922,254:

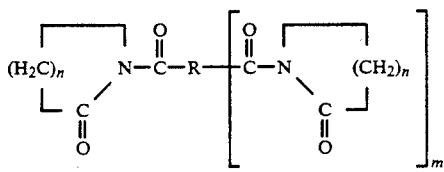

Wherein R is an alkylene or arylene group or other connecting group as described in U.S. Pat. Nos. 3,862,262 and 3,922,254, and wherein n is an integer from 2 to 11 and m is an integer from 1 to 3.

As a catalyst a lactamate salt may be used, of the general formula:

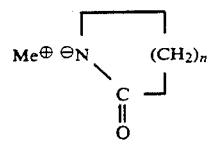

Wherein Me is chosen from the group of lithium, sodium, potassium, magnesium chloride, magnesium bromide, magnesium lactamate, calcium chloride, calcium bromide, calcium lactamate and wherein n is an integer from 2 to 11. Most conveniently, such a catalyst may be formed in situ, e.g., by addition of a Grignard compound, such as ethylmagnesiumbromide. At temperatures above 130° C., and preferably above 150° C., the polymerization of the lactam to the polyamide (e.g. Nylon-6) occurs to form the in situ composite.

Numerous other species of polyazomethines are suitable as the in situ rigid rod polymer of the present invention. For example, dicarbonyl compounds of the following general formulas may be used as precursors to polyazomethine:

$$O=C(R_1)-R_3-C(R_2)=O \quad \text{I}$$

or:

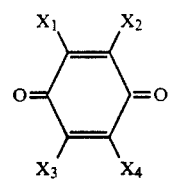

In dicarbonyl compounds of the general formula I, $R_1$ and $R_2$ may be chosen from the group of hydrogen or methyl and $R_3$ is an arene group, such as phenylene, biphenylene, triphenylene, napthylene or anthralene wherein the carbonyl groups are substantially or completely in para position to each other. Examples of dicarbonyl compounds of formula I include: terephthalaldehyde; 1,4-diacetylbenzene; 4,4'-biphenyl dialdehyde; 2,6-dimethylterephthalaldehyde; 2,3,5,6-tetramethylterephthalaldehyde.

Dicarbonyl compounds of formula II are paraquinones. In such compounds, X, $X_2$, $X_3$ and $X_4$ may be hydrogen, an alkyl group containing one to four carbon atoms, chlorine, or fluorine. Alternatively, X, and $X_2$ or $X_3$ and $X_4$ can represent attached benzene rings, e.g., as follows:

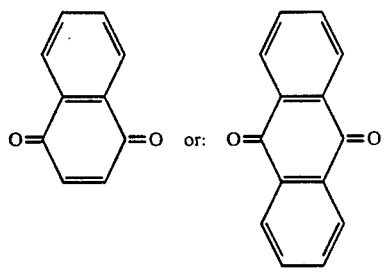

Examples of dicarbonyl compounds of formula II are p-benzoquinone, 1,4-naphthaquinone, anthraquinone, and 2,3,5,6-tetramethyl-p-benzoquinone.

Alternatively, polyazomethine precursors may be primary diamines of the following general formula:

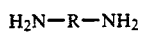  III

Wherein R is an arene such as phenylene, biphenylene, naphthalene or anthrarylene with the amino groups substantially or completely in para-position to each other. These arene groups may also have alkyl substituents containing up to four carbon atoms, chlorine substituents and fluorine substituents. Examples of the primary diamine polyazomethine precursors having the general formula III are p-phenylene diamine, 4,4'-biphenyl diamine, 1,4 naphthylene diamine, 1-chloro-2,5-diaminobenzene, 3,3'-dichloro-4,4'-biphenylene diamine, and 2,3,5,6-tetramethyl-1,4-phenylenediamine. 2,5-dichloro-1,4-phenylenediamine and terepthalaldehyde may be employed as precursors of the in situ rigid rod polymer, thereby forming an in situ rigid polymer. Similarly, for example, 2,3,5,6-tetramethyl-1,4-phenylene diamine and terephthaldehyde may be employed as the rigid polymer precursors, producing another species of polyazomethine in situ rigid rod polymer. O-tolidine sulfone, having the following structure and terephthalaldehyde are also suitable precursors to an in situ rigid polymer:

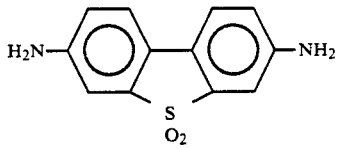

Aromatic para-linked polyimides are also suitable as in situ rigid rod polymers. The aromatic para-linked polyimides have the following general formula:

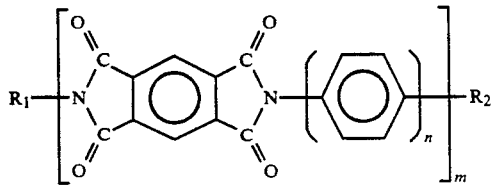

Where $R_1$ is 4-aminophenyl or a pyromellitic monoanhydridephenylimide, n is an integer from 1 to about 10, m is an integer from about 50 to about 500 and $R_2$ is an amine or anhydride moeity such as pyromellitic monoanhydrideimide. Pyromellitic monoanhydridephenylimide has the general formula:

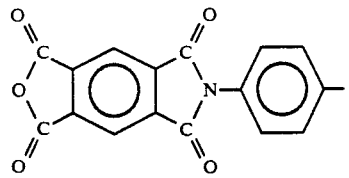

Pyromelltic monoanhydrideimide has the following structure:

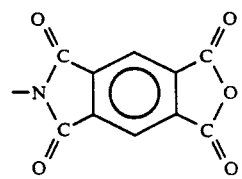

Precursors to the aromatic para-linked polyimides include para-diamino-phenylenes, such as 1,4-diaminophenylene, and para-diisocyanatophenylenes, such as 1,4-phenylene-diisocyanate or 4,4'-biphenylene-diisocyanate and symmetrical bis-anhydrides, such as pyromelliticdianhydride, dimethyl-pyromelliticdianhydride, dichloro-pyromelliticdianhydride, 1,4,5,8-naphthalene tetracarboxylicdianhydride, 3,4,9,10-perylene tetracarboxlyicdianhydride.

Also useful as in situ rigid rod polymers of the present invention are the aromatic polyimidazolones of the following general formula:

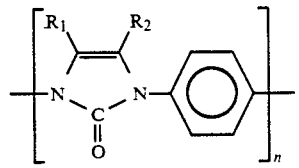

Wherein $R_1$ and $R_2$ are selected from the group of hydrogen, phenyl or methyl and n is an integer from 20 to 200. Typical precursors to the aromatic polyimidazolens are benzoine, p-phenylene diamine and 1,4-dicyanatophenylene. The formation of such aromatic polyimidazolones is known to the art and has been described by G. Blinne, et al. in *Makromol. Chemie*, 177, 1687(1976).

Poly-(azo-p-phenylene) obtained from the reductive polymerization of p-nitro-aniline or by oxidative polymerzation of p-phenylenediamine is also suitable as the rigid rod polymer of the present invention. The poly-(azo-p-phenylenes) are known in the art and their synthesis is described by J. Laakso et. al., *Polym. Bull.*, 18, 196 (1987).

Numerous other polymers with rigid rod structures sufficient to impart improved structural and physical properties to a matrix polymer are suitable for use in the present invention. For example, polyphenylene azoxides, such as those obtained from the self-condensation of p-nitroaniline or from the self condensation of 1,2-diamino-4,5-dinitrobenzene compounds; poly-p-phenylenebenzobisoxazoles, poly-p-phenylenebenzobisthiazoles and poly-p-phenylenebenzobisimidazoles are all suitable for use as the in situ rigid rod polymers of the present invention.

The in situ matrix polymers may be typical thermoplastic, rubber or thermoset compositions. Polyamides, such as nylon-6, produced from lactams are particularly useful as the in situ matrix polymers. Numerous other polymers are useful as the in situ matrix polymers of the present invention. Typical examples of other in situ matrix polymers include the following: polyesters, derived from lactones; polyethers, derived from oxiranes; polyacylimides, produced from oxazolines; poly-etheresters, derived from oxiranes and cyclic anhydrides; stabilized polyformals of the Delrin type, derived from trioxane and epoxies; polycarbonates, derived from cyclic carbonate oligomers; polysulfides, derived from thiaranes; and polysiloxanes derived from cyclic siloxanes. Additionally, thermoset compositions useful as the in situ matrix polymers of the present invention may be produced from liquid unsaturated polyesters and vinyl monomers, such as styrene, acrylates, vinyl ethers, poly-acrylics, etc., formaldehyde-phenolic resins or methylolated phenol, melamine-phenolic resins and the like.

The rigid rod polymers may also be produced in situ in liquid telechelics, such as functionally terminated poly-dienes terminated with —OH, —COOH or —NH$_2$ groups, or liquid polyether polyols such as diols, triols and tetrols. Subsequent addition of chain extenders and/or cross linkers, such as di- or polyisocyanate, di- or polyaziridines and di- or poly-epoxides, may then be employed to produce the in situ matrix polymers.

Melts of thermoplastic matrix polymers of number average molecular weight less than 20,000 and particularly less than 10,000, may be used to dissolve the rigid rod precursors for the production of rigid rod polymers. Subsequently, these matrix polymer melts may be chain extended and/or crosslinked to the final in situ matrix polymer composites. Alternatively, liquid compositions of matrix polymers and liquid monomers, such as aromatic polyethers, polyesters, polyketones or polyetherketones and styrene, acrylate or methacrylate monoers may be added as the solvent in the formation of the in situ rigid rod polymers from their precursors. The monomer may be subsequently or simultaneously polymerized.

The present invention is readily adaptable to commercial production of useful articles of manufacture composed of the in situ composite materials of the present invention. The composite materials of the present invention are suitable for use in numerous commercial articles, e.g., as automobile panels and bumpers. Numerous manufacturing processes may be employed. For example, a process of manufacture of articles made of the in situ composite material may be carried out in a state of the art polymer processing extruder, such as a twin screw extruder. In this process, the precursors of the in situ rigid rod polymer are dissolved in the precursors of the in situ matrix polymer. The precursors of the rigid rod polymer are reacted to form the in situ rigid rod polymer in the first mixing section of the twin screw extruder. The precursors to the in situ matrix polymer containing the rigid rod polymers are mixed with initiators and/or catalysts in the second mixing section of the twin screw extruder. The resulting material is then transferred into a (heated) mold in which the polymerization of the matrix precursor to the matrix polymer takes place, thus forming an article of manufacture. Alternatively, the polymerization of the matrix polymer may take place in the last stage of the extrusion and be subsequently formed into shaped articles, such as molded parts, fibers or films. Other methods of manufacture of articles of in situ composite material may be similarly employed.

The following examples illustrate the present invention, but are not intended to limit the claims in any manner whatsoever.

EXAMPLE NO. 1

140 g $\epsilon$-caprolactam, was placed into a 3 necked 0.5 liter flask, equipped with stirrer, thermometer, gas inlet and outlet. The caprolactam was heated to a complete melt while a slow stream of dry nitrogen was passed through the apparatus. 6.6 g terephthalaldehyde (TPA), was added and dissolved into the melt. Separately, a solution of 5.5 g p-phenylenediamine (p-PDA) was prepared in 50 g of molten $\epsilon$-caprolactam in a 0.5 liter Erlenmeyer flask. This solution was poured into the TPA/caprolactam melt with vigorous agitation. The solution instantly turned a deep red color, indicating a reaction of the TPA and p-PDA to form a polyazomethine (PAM) hasd occurred. The Erlenmeyer flask was rinsed out with about 50 ml. of toluene into the TPA solution. After about five minutes at a temperature of 75° to 80° C., a turbid orange-red liquid resulted, having the appearance and viscosity of a thin paint. The reaction mixture was heated to about 140° C. to distill off the toluene and the water produced by reaction of the TPA and p-PDA as an azeotrope. At about 200° C., about 40 ml. of distillate was collected. The melt was allowed to cool to 120° C., when 4.9 g of a bis-caprolactam adduct of 4,4'-diisocyanatophenylmethane was added, which dissolved readily. At about 85° C., 7.5 ml. of a 2.8 molar solution of ethylmagnesiumbromide ($C_2H_5MgBr$) in diethylether was injected into the melt. After some initial foaming due to the evolution of ethane and ether, the liquid was degassed by applying a vacuum for about five minutes. The resulting bright yellow liquid was transferred into a preheated Teflon coated sheet mold (about 130°–150° C.). The mold was closed and placed in an oven at about 160° C. for approximately one and a half hours. The mold was then cooled to room temperature and the solid sheet produced in the mold was easily removed. The solid sheet had a homogenous yellow appearance and had a Durometer Hardness of 85 D. Other properties of this in situ composite are listed in Table I.

EXAMPLE NO. 2

The equipment described in Example 1 was used. A solution of 6.6 g TPA in 100 g molten caprolactam was mixed with a solution of 9.9 g dichloro-1,4-phenylenediamine (DCPDA) in 90 g molten caprolactam. The reaction mixture turned dark purple and became bright yellow-orange at about 140° C. After the reaction water was removed with toluene as an azeotrope as in example 1, 5.0 g of a bis-lactam initiator made from hexamethylene diisocyanate and caprolatam was added. At about 85° C., 7.5 ml of a 2.8 molar solution of ethylmagnesiumbromide were added. The resulting reaction mixture was degassed and polymerized in a mold at 160° C. A homogeneous sheet was produced with a Shore durometer hardness of about 85 D. Other properties of the in situ composite of Example 2 are listed in Table I.

EXAMPLE NO. 3

The basic procedure was as in Example 1, except a 2 liter resin kettle was used. Solutions of 15.4 g TPA in 150 g molten caprolactam and 20 g 2,3,4,6-tetramethyl-1,4-phenylenediamine (TMPA) in 114 g molten caprolactam were combined. The dialdehyde and diamine reacted to produce a dark red liquid. The reaction water was then removed by azeotrop with toluene. 6.0 g of initiator (same as in Example 3) and 12 ml of 2.8 molar $C_2H_5M_gBr$ was added. The liquid was degassed and polymerized in the mold at 160° C., as described before. The properties of the hard, solid composite are shown in Table I.

EXAMPLE NO. 4

A solution of 40.2 g TPA in 300 ml 2-pyrrolidone was mixed with a solution of 33 g p-PDA in 150 ml 2-pyrrolidone. The resulting deep red liquid was heated from about 90° C. to about 218° C. (over a period of 3 hours). A total of 56 ml liquid was distilled over. After cooling to room temperature a paste-like dispersion of polyazomethine in pyrrolidone resulted. The paste was diluted with water, the solid polyazomethine was filtered off, washed repeatedly with water, extracted with ethanol and dried at 100° C. About 61 g solid polyazomethine was obtained and was ground manually.

About 20 g of the ground polyazomethine was dispersed in 200 g molten caprolactam, under dry $N_2$ in a 0.5 liter flask. Lactam, 30 g, was distilled off under vacuum, to assure dryness. A bis-caprolactam adduct of 4,4'-diisocyanatophenyl-methane, 5 g, was added as an initiator and 7.5 ml, of a 2.8 molar solution of $C_2H_5M_gBr$ was added. After degassing, the dispersion was transferred to a pre-heated mold and the lactam was polymerized to nylon-6 at 160° C., as described before. The properties of the composite are shown in Table I.

EXAMPLE NO. 5

The same prepared polyazomethine as used in Example 4 was pulverized into powder form. Ten percent by weight of this powder was physically mixed with 90% by weight of nylon 6 used in Example 6, below. The mixed powders were compression molded into a 6 inch×6 inch plate or sheet. Mechanical tensile and flexural samples were cut from such sheets. The results are presented in Table 1.

EXAMPLE NO. 6

Caprolactam, 230 g, was melted in a 0.5 liter 3-necked flask, equipped with mechanical stirrer, thermometer and gas-in and outlet. Lactam, 35 g, was distilled off under vacuum to assure dryness. 10 g of a bis-lactam adduct of 4,4'-diisocyanatophenylmethane was added as a polymerization initiator and subsequently 6 ml of a 2.8 molar solution of $C_2H_5M_gBr$ were added. After degassing, the melt was poured into a preheated (140°-150° C.) Teflon coated sheet mold. The closed mold was placed in an oven at 150°-160° C. for 2 hrs. The properties of molded nylon-6 sheet are shown in Table I.

EXAMPLE NO. 7

Acrylonitrile, 25 g, and Vazo-64 (azo-bis-isobutyronitrile), 0.3 g, were added to 200 g molten caprolactam (in equipment as described above in Example 1). The liquid was heated under $N_2$ atmosphere for 1 hour at 75° to 105° C., in order to polymerize the acrylonitrile. A bis-caprolactam adduct of 4,4'-diisocyanatophenylmethane, 5 g, was added as an initiator. Subsequently 7.5 ml of a 2.8 molar solution of $C_2H_5M_gBr$ was added. After degassing, the deep red melt was poured into a preheated mold and the remainder into a steel can with perforated lid. The material remained liquid for 1.5 hrs. at about 160° C. After cooling to room temperature a very dark, brittle and weak material was obtained, which broke and crumbled easily when removed from the mold.

EXAMPLE NO. 8

$CaCO_3$, 20 g, was mechanically dispersed in 180 g molten caprolactam. Toluene, 50 ml, was added and the water of reaction and the toluene were removed as an azeotrope. After all of the toluene was distilled off, 5 g initiator (made from hexamethylenediisocyanate and caprolactam) and 7.5 ml of a 2.8 molar solution of $C_2H_5M_gBr$ was added. The mixture was degassed and poured into a preheated mold, which was placed in an oven at 160° C. for 1.5 hrs. The properties of the particulate filled nylon-6 are listed in Table I.

EXAMPLE NO. 9

A 1 liter flask was used. A solution of 6.7 g TPA in 100 g molten caprolactam was mixed with a solution of 13.7 g tolidine sulfone in 300 g molten caprolactam. A deep red color developed instantly, turning to a bright orange liquid. Reaction water was removed as an azeotrope with toluene. 29 ml of a 2.8 molar $C_2H_5M_gBr$ solution were added. To about half of the reaction mixture 4.8 g of the initiator, as used above in Examples 3 and 4, were added. This material was polymerized, at 160° C., in a metal can. A very hard, stiff and strong composite was obtained.

EXAMPLE NO. 10

The molded products of Examples No. 1, No. 4, and No. 6 were subjected to dynamic mechanical thermal analysis to determine the glass transition temperatures of these products. FIG. 1 shows a graph of TAN ($\delta$) versus temperature for these molded products. The observed shift in the glass transition temperature, Tg, with increased percentage composition of polyazomethine indicates that at higher percent compositions the polyazomethine makes the material more thermally stable.

EXAMPLE NO. 11

The molded products of Examples No. 1, No. 4 and No. 6 were subjected to dynamic mechanical thermal analysis for storage modulus versus temperature. The increased thermal resistance and mechanical performance of the polyazomethine composites over the calcium carbonate loaded nylon 6 is clearly shown in FIG. 2. The calcium carbonate loaded nylon-6 shows mechanical properties improved over those of the pure or neat nylon-6 matrix. However, at the glass transition temperature of nylon-6, the mechanical properties of the calcium carbonate loaded nylon-6 begin to diminish drastically.

TABLE 1

IN SITU COMPOSITES MECHANICAL TEST RESULTS

| Composition | By Wt. | Test Cond. | Spec. Gravity g/cm | Tensile Mod. (MSI)[1] | Tensile Strength (KSI)[2] | Elongation brk. % | Flexural Mod (MSI) | Flexural Strength (KSI) |
|---|---|---|---|---|---|---|---|---|
| p-PDA-PAM/ Nylon 6 (Example No. 1) | 5/95 | Dry 50% R.H. | 1.170 — | 0.43 0.43 | 12.0 11.5 | 4 3.9 | 0.63 0.61 | 17.9 18.0 |
| DCPDA-PAM/ Nylon 6 (Example No. 2) | 10/90 | Dry 50% R.H. | 1.159 — | 0.36 0.30 | 9.1 7.2 | 5 5 | 0.44 0.36 | 15.7 13.7 |
| TMPDA-PAM/ Nylon 6 (Example No. 3) | 10/90 | 50% R.H. | — | — | 8.2 | 11 | 0.49 | 15.5 |
| p-PDA-PAM/Nylon 6[3] (Example No. 4) | 10/90 | Dry 50% R.H. | 1.175 — | 0.44 0.43 | 9.6 9.2 | 3 2.6 | 0.65 0.60 | 13.1 14.5 |
| p-PDA-PAM/Nylon 6[4] (Example No. 5) | 10/90 | Dry 50% R.H. | 1.146 — | 0.08 0.14 | 1.77 0.93 | 1 2 | 0.27 0.27 | 5.2 3.4 |
| Nylon 6 (Example No. 6)[5] | 100 | Dry 50% R.H. | Not Det. | 0.20 0.18 | 11.0 9.3 | 5 5 | 0.30 0.27 | 16.4 13.9 |
| PAM/Nylon 6 (Example No. 7)[6] | 10/90 | | Not Tested | Test Sample crumbled when removed from mold. | | | | |
| CaCO3/ Nylon 6[7] (Example No. 8) | 10/90 | Dry 50% R.H. | 1.190 — | 0.43 0.34 | 11.9 9.0 | 5 5 | 0.55 0.33 | 18.0 11.5 |

[1] MSI = $10^6$ psi
[2] KSI = $10^3$ psi
[3] semi in situ composite
[4] melt blended PAM and Nylon 6
[5] unfilled Nylon 6
[6] polyacrylonitrile/Nylon 6
[7] particulate filled Nylon 6

The above mentioned patents and publications are incorporated herein by reference. Obviously, many variations of the present invention will be apparent to those skilled in the art in light of the above detailed description, all such obvious variations are within the full intended scope of the following claims.

What is claimed is:

1. A composite material comprised of:
   a. an effective amount of an in situ polymerized rigid rod polymer; and
   b. an in situ polymerized matrix polymer;
   wherein the precursors of said rigid rod polymer are polymerized while dissolved in the precursors of said matrix polymer.

2. A composite material according to claim 1 wherein the in situ polymerized rigid rod polymer is present in an amount up to about 80 parts by weight per 100 parts of the composite material.

3. A composite material according to claim 1 wherein the in situ polymerized rigid rod polymer is selected from the group consisting of polyazomethines derived from 2,5-chloro-1,4-phenylenediamine, tetramethyl-1,4-phenylene diamine, tolidine sulfone and terephthalaldehyde.

4. A composite material according to claim 1 wherein the in situ polymerized matrix polymer is nylon-6.

5. A composite material according to claim 1 wherein the in situ polymerized rigid rod polymer is an aromatic polyimide of the general formula:

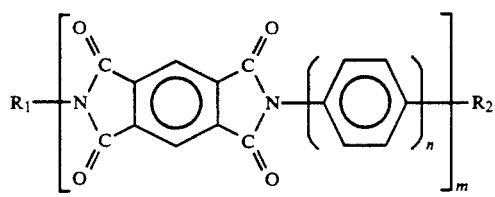

Wherein $R_1$ is 4-aminophenyl or a pyromellitic monoanhydridephenylimide; $R_2$ is amino, or a pyromellitic monoanhydrideimide and wherein n is an integer from 1 to 100 and m is an integer from about 50 to about 500.

6. A composite material according to claim 1 wherein the in situ polymerized rigid rod polymer is an aromatic polyimidazolone of the general formula:

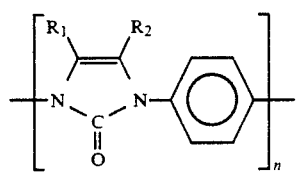

Wherein $R_1$ and $R_2$ are selected from the group of hydrogen, phenyl and methyl, and wherein n is an integer from 20 to 200.

7. An in situ composite material according to claim 1 wherein the in situ polymerized rigid rod polymer is a polyphenylene azoxide.

8. An in situ composite material according to claim 1 wherein the in situ polymerized rigid rod polymer is selected from the group consisting of poly-p-phenylenebenzobisoxazole, poly-p-phenylenebenzobisthiazole and poly-p-phenylenebenzobisimidazole.

9. An in situ composite material according to claim 1 wherein the in situ polymerized matrix polymer is selected from the group consisting of polyamides, polyesters, polyethers, polyacylimides, polyether-esters, polycarbonates, polysulfides, polyformals, and polysiloxanes.

10. A composite material according to claim 1 wherein the in situ polymerized rigid rod polymer is present in an amount of up to about 10 parts by weight per 100 parts by weight of the composite material.

11. An article of manufacture formed from a composite material comprised of:

a. an effective amount of an in situ polymerized rigid rod polymer, and b. an in situ polymerized matrix polymer;

wherein the precursors of said rigid rod polymer are polymerized while dissolved in the precursors of said matrix polymer.

12. An in situ composite material according to claim 1 wherein the in situ polymerized rigid polymer is a poly-(azo-p-phenylene).

13. A composite material according to claim 1 wherein the aspect ratio of the in situ rigid rod polymer is greater than or equal to about 50.

14. The composite material as defined in claim 1, wherein the insitu polymerized rigid rod polymer is a polyazomethine.

15. The composite material as defined in claim 1 wherein the matrix polymer is polyamide.

16. The composite material as defined in claim 1 wherein the rigid rod polymer is polyazomethine derived from p-phenelenediamine and terephthalaldehyde and wherein the matrix polymer is nylon-6.

* * * * *